United States Patent
Isahagian et al.

(10) Patent No.: US 11,568,281 B2
(45) Date of Patent: Jan. 31, 2023

(54) CAUSAL REASONING FOR EXPLANATION OF MODEL PREDICTIONS

(71) Applicant: International Business Machines Corporation, Armonk, NY (US)

(72) Inventors: Vatche Isahagian, Belmont, MA (US); Vinod Muthusamy, Austin, TX (US); Steve Jan, Blacksburg, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 585 days.

(21) Appl. No.: 16/682,643

(22) Filed: Nov. 13, 2019

(65) Prior Publication Data

US 2021/0142190 A1  May 13, 2021

(51) Int. Cl.
  *G06N 5/04* (2006.01)
  *G06N 20/00* (2019.01)
  *G06K 9/62* (2022.01)

(52) U.S. Cl.
  CPC ............... *G06N 5/04* (2013.01); *G06K 9/623* (2013.01); *G06K 9/6256* (2013.01); *G06K 9/6268* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 10,365,640 B2* | 7/2019 | Baseman | G05B 13/0265 |
| 11,176,471 B1* | 11/2021 | DeCaprio | G06N 20/00 |
| 11,263,555 B2* | 3/2022 | Saito | G06N 5/045 |
| 2017/0270427 A1 | 9/2017 | Zhou et al. | |
| 2018/0101652 A1 | 4/2018 | Kochura et al. | |
| 2018/0101657 A1 | 4/2018 | Kochura et al. | |
| 2019/0108196 A1 | 4/2019 | Hannula | |

FOREIGN PATENT DOCUMENTS

| | | |
|---|---|---|
| CN | 102385705 B | 9/2013 |
| CN | 107301119 A | 10/2017 |
| WO | 9321587 A3 | 11/1993 |
| WO | 201506517 A2 | 1/2015 |

OTHER PUBLICATIONS

Ribeiro, et al., "Why should i trust you?: Explaining the predictions of any classifier." Proceedings of the 22nd ACM SIGKDD international conference on knowledge discovery and data mining, (2016).

Liu, et al., "Adversarial detection with model interpretation." Proceedings of the 24th ACM SIGKDD International Conference on Knowledge Discovery & Data Mining. ACM, (2018).

(Continued)

*Primary Examiner* — Dov Popovici
(74) *Attorney, Agent, or Firm* — Amin, Turocy & Watson, LLP

(57) ABSTRACT

Techniques facilitating causal reasoning for explanation of model predictions are provided. A system can generate one or more explanations of a machine learning model prediction. The one or more explanations can be based on causal relationships determined between feature data of a set of feature data and based on dataset point samples around a trace associated with the causal relationships.

25 Claims, 15 Drawing Sheets

(56) References Cited

OTHER PUBLICATIONS

Ribeiro, et al., "Anchors: High-precision model-agnostic explanations." Thirty-Second AAAI Conference on Artificial Intelligence. (2018).
Li, et al., "Deep learning for case-based reasoning through prototypes: A neural network that explains its predictions." Thirty-Second AAAI Conference on Artificial Intelligence. (2018).
Chu, et al. "Exact and consistent interpretation for piecewise linear neural networks: A closed form solution." Proceedings of the 24th ACM SIGKDD International Conference on Knowledge Discovery & Data Mining. ACM, (2018).
Alvarez-Melis, et al. "Towards robust interpretability with self-explaining neural networks." Advances in Neural Information Processing Systems. (2018).
Zhang, et al. "Interpreting cnn knowledge via an explanatory graph." Thirty-Second AAAI Conference on Artificial Intelligence. (2018).
Fong, et al., "Interpretable explanations of black boxes by meaningful perturbation." Proceedings of the IEEE International Conference on Computer Vision. (2017).
Tao, et al. "Attacks meet interpretability: Attribute-steered detection of adversarial samples." Advances in Neural Information Processing Systems. (2018).
Yeh, et al. "Representer point selection for explaining deep neural networks." Advances in Neural Information Processing Systems. (2018).
Koh, et al., "Understanding black-box predictions via influence functions." Proceedings of the 34th International Conference on Machine Learning—vol. 70. JMLR. org, (2017).

\* cited by examiner

FIG. 9A

| Cause (802) | Effect (804) | |
|---|---|---|
| Loan Amount (806) | Activity at T1 | T1 |
| Activity at T1 (808) | Activity at T0 | |
| Credit Score (810) | Activity at T0 | T0 |
| Risk Score (812) | Activity at T0 | |

FIG. 9B

| | | |
|---|---|---|
| Loan Amount (806) | Activity at T1 | T1 |
| Activity at T1 (808) | Activity at T0 | |
| Credit Score (810) | Activity at T0 | T0 |
| Risk Score (812) | Activity at T0 | |

FIG. 9C

| | | |
|---|---|---|
| Loan Amount | Activity at T1 (902) | T1 |
| Activity at T1 (904) | Activity at T0 | |
| Credit Score | Activity at T0 | T0 |
| Risk Score | Activity at T0 | |

CAUSAL REASONING FOR EXPLANATION OF MODEL PREDICTIONS

BACKGROUND

The subject disclosure relates to deep learning and artificial intelligence computing and, more specifically, to facilitating explanations related to an outcome of the deep learning and artificial intelligence computing. As machine learning and deep learning models gain widespread adoption, understanding the reasons behind prediction is used to gain the trust of users of Artificial Intelligence (AI) systems. Several different frameworks (e.g. Local Interpretable Model-agnostic Explanations (LIME), etc.) have been developed to provide explanations with regards to model predictions. These frameworks assume features used in the explanation are independent of one another. This is typically not the case in various processes that can have several features that are dependent on one other. Accordingly, treating features as independent of one another while accurate in some situations, are not useful in many other situations. Further, while frameworks such as LIME can highlight the main feature affecting the prediction, that main feature does not provide the causal reasoning behind it (due to the independence assumption).

For example, Hannula (U.S. Patent Application Publication No. 2019/0108196) discusses "performing predictive analysis on an external index number describing quality of an information system based on a dynamic causal loop diagram of a plurality of quality meters describing the information system." See Abstract. As discussed in Hannula, "the [Quality Intelligence] QI tools 103 can be independent, each processing a measurement of the information system independently of the other tools." See paragraph [0032]. "This means that each tool can take a sample of the information flow and/or data flow of the information system." See id. Hannula, however, lacks the ability to provide one or more explanations on how a machine learning algorithm has reached its decision.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate causal reasoning for explanation of model predictions are provided.

According to an embodiment, a system can comprise a memory that stores computer executable components and a processor that executes the computer executable components stored in the memory. The computer executable components can comprise an interpretation component that generates one or more explanations of a machine learning model prediction. The one or more explanations can be based on causal relationships determined between feature data of a set of feature data. An advantage of such a system is that by determining causal relationships between the feature data, more than one explanation can be provided.

According to another embodiment, a computer-implemented method can comprise generating, by a system operatively coupled to a processor, one or more explanations of a machine learning model prediction based on causal relationships determined between feature data of a set of feature data. An advantage of such a computer-implemented method is that determining causal relationships between the feature data, more than one explanation can be provided to explain the machine learning model prediction.

According to a further embodiment, a computer program product that facilitates causal reasoning for explanations of model predictions is provided. The computer program product can comprise a computer readable storage medium having program instructions embodied therewith, the program instructions can be executable by a processing component to cause the processing component to generate one or more explanations of a machine learning model prediction based on causal relationships determined between feature data of a set of feature data. An advantage of such a computer program product is that determining causal relationships between the feature data can yield multiple explanations for the prediction determined by the machine learning model.

Yet another embodiment relates to a computer-implemented method that can comprise determining, by a device operatively coupled to a processor, causal relationships between features of a dataset based on a defined process flow graph. The computer-implemented method also can comprise grouping, by the device, features of a dataset based on one or more dependencies between features of the dataset. Further, the computer-implemented method can comprise sampling, by the device, dataset points around respective traces associated with the one or more dependencies, resulting in sampled dataset points. The computer-implemented method also can comprise utilizing, by the device, a classifier to obtain labels of the sampled dataset points. In addition, the computer-implemented method can comprise sorting, by the device, the features of the dataset into an ordering based on a contribution level associated with the one or more explanations of a machine learning model prediction. The computer-implemented method can also comprise outputting, by the system, the one or more explanations based on the ordering. An advantage of such a computer-implemented method is that determining causal relationships between the features of a dataset can result in more than one explanation for the prediction determined by the machine learning model that are sorted in an order of contribution.

Another embodiment relates to a device that can comprise a memory that stores computer executable components. The device can also comprise a processor that executes the computer executable components stored in the memory. The computer executable components can comprise a reference component that determines one or more dependencies between features of a dataset based on a defined process flow graph. The computer executable components also can comprise an aggregation component that groups one or more features of a dataset based on one or more dependencies between features of the dataset. Further, the computer executable components can comprise an analysis component that samples dataset points around respective traces associated with the one or more dependencies, resulting in sampled dataset points. The computer executable components can also comprise a classifier component that obtains labels of the sampled dataset points. Also included in the computer executable components can be a ranking component that sorts the features of the dataset into an ordering based on a contribution level associated with the one or more explanations of a machine learning model prediction. Further, the computer executable components can comprise an interpretation component that outputs the one or more explanations based on the ordering. An advantage of such a computer-implemented method is that determining causal relationships can facilitate generation of the one or more explanations that explains which features of the dataset effected and/or influenced the machine learning model prediction in an order of contribution.

DESCRIPTION OF THE DRAWINGS

FIG. 9A illustrates splitting a causal table based on effected activity, in accordance with one or more embodiments described herein.

FIG. 9B illustrates grouping the causes and effect features in accordance with one or more embodiments described herein.

FIG. 9C illustrates handling overlap between groups in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
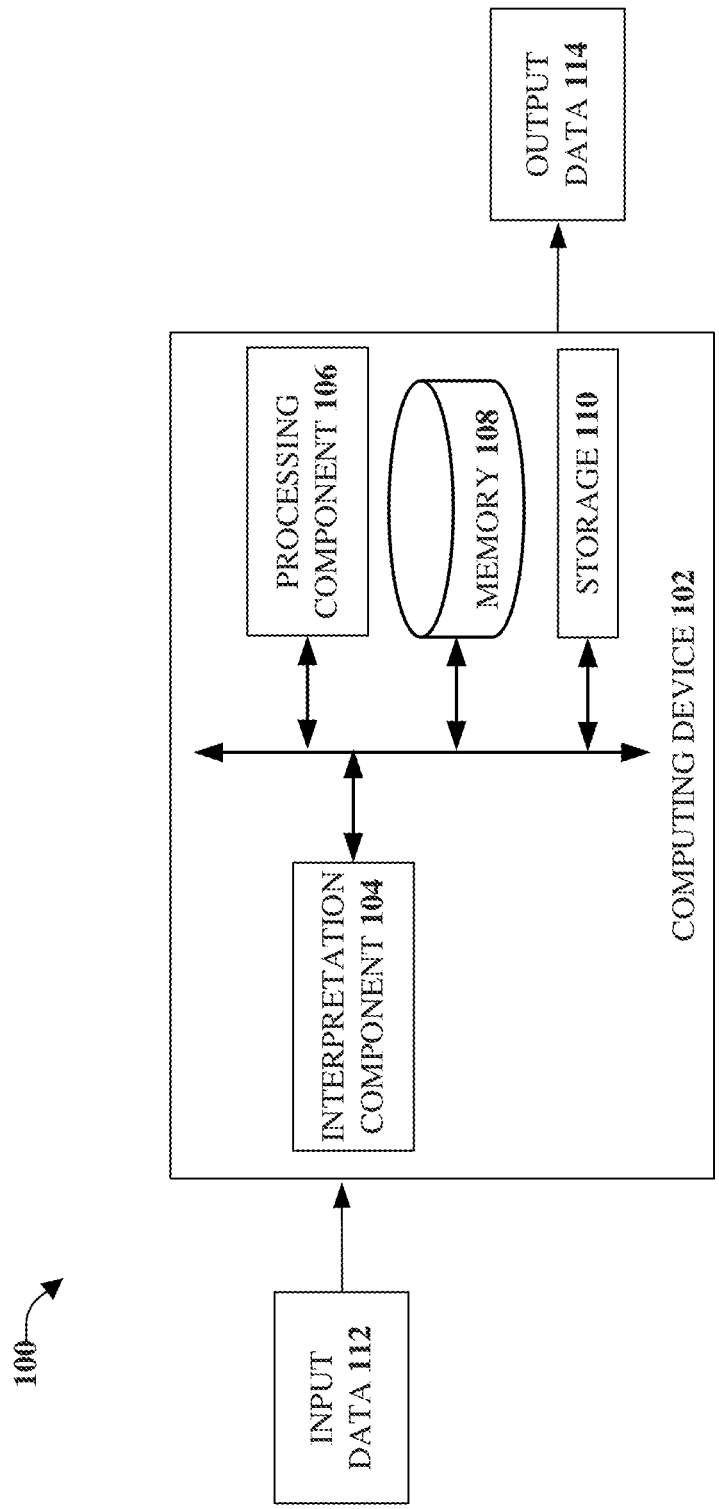
FIG. 1 illustrates a block diagram of an example, non-limiting, system that facilitates causal reasoning for explanation of model predictions in accordance with one or more embodiments described herein.

FIG. 1 illustrates a block diagram of an example, non-limiting, system 100 that facilitates causal reasoning for explanation of model predictions in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a computing system associated with technologies such as, but not limited to, circuit technologies, processor technologies, computing technologies, artificial intelligence technologies, medicine and materials technologies, supply chain and logistics technologies, financial services technologies, and/or other digital technologies. The system 100 can employ hardware and/or software to solve problems that are highly technical in nature (e.g., providing one or more explanations of a decision determined by machine learning system, generate one or more causal relationships generated as input, generate the one or more causal factors using different techniques such as static program analysis, causal inferences, business process model descriptions, and so forth), that are not abstract and that cannot be performed as a set of mental acts by a human. Further, in certain embodiments, some of the processes performed can be performed by one or more specialized computers (e.g., one or more specialized processing units, a specialized computer with an interpretation component, a classifier component, and so on) to carry out defined tasks related to machine learning for facilitating an output of one or more explanations of a machine learning model prediction based on causal relationships determined between feature data of a set of feature data and based on dataset point samples around a trace associated with the causal relationships.

The system 100 and/or components of the system 100 can be employed to solve new problems that arise through advancements in technologies, computer architecture, and/or the like. The system 100 (and other embodiments discussed herein) can use a single set of feature vector and generate similar sets of feature vectors through perturbation, use causal inference algorithms while considering causal relations, including causal relations in business processes, and use the causal relationships to restrict perturbations for machine learning model explainability (e.g., ability to explain). One or more embodiments of the system 100 can provide technical improvements to computing systems, circuit systems, processor systems, artificial intelligence systems, deep learning computing systems, and/or other systems.

In the embodiment shown in FIG. 1, the system 100 can comprise a computing device 102 that can comprise an interpretation component 104, a processing component 106, a memory 108, and/or a storage 110. The memory 108 can store computer executable components and instructions. The processing component 106 (e.g., a processor) can facilitate execution of the instructions (e.g., computer executable components and corresponding instructions) by the interpretation component 104, and/or other system components. As shown, in some embodiments, one or more of the interpretation component 104, the processing component 106, the memory 108, and/or the storage 110 can be electrically, communicatively, and/or operatively coupled to one another to perform one or more functions of the computing device 102.

The interpretation component 104 can receive, as input data 112, causal relationships determined between feature data of a set of feature data. The causal relationships can be dependencies between respective feature data of the group of feature data. Further, the interpretation component 104 can receive, as the input data 112, dataset point samples around a trace associated with the causal relationships.

Based on the input data 112 (e.g., the causal relationships and the dataset point samples), the interpretation component 104 can generate one or more explanations of a machine learning model prediction. The one or more explanations generated by the interpretation component 104 can be output as output data 114.

It is to be appreciated that the system 100 (and other embodiments discussed herein) provides a technical improvement related to helping a processor to determine and provide the output data 114 faster based on the evaluation of the one or more dependencies or causal relationships between the input data 112. Further, the system 100 (and other embodiments discussed herein) provides a practical application related to explaining details of one or more inputs of deep learning and/or artificial intelligence computing that resulted in the determined output of the deep learning and/or artificial intelligence computing. Previously, only a single input was explained as a cause of the output, although more than one input could have contributed to the generated outputs. Accordingly, by providing more than one explanation, one or more inputs can be modified in order to change the output. Further, the disclosed aspects are driven by new technology (e.g., deep learning and/or artificial intelligence computing) to solve problems associated with providing only a single contributing input factor associated with a predication by a machine learning model. The system 100 can also be fully operational towards performing one or more other functions (e.g., fully powered on, fully executed, etc.) while also performing the above-referenced computing processes.

As mentioned above, details related to how a model behaves are becoming beneficial in deep learning and in AI in general. Therefore, frameworks, such as LIME, have been developed. A disadvantage of these frameworks (LIME, for example) is that the frameworks assume a black-box model, which means there is no mechanism to know what the model is doing. The entity using the model can input questions, but does not know how the explanations are being derived. LIME operates by receiving input features and deriving an outcome from a model and a single feature that explains the prediction (e.g., the outcome) is determined based on the input. What LIME assumes, however, is that the input features used in the perturbation process are independent from one another. This is a problem because in some applications the features are independent and the output is valid. However, in other applications, such as business processes, such an assumption is not true because there is an explicit dependency. What this means is that in best case provided is an incomplete explanation and in the worst case, the explanation is misleading. The disclosed aspects provide a solution to address the situations related to incomplete and/or misleading explanations by considering dependent features. Therefore, the disclosed aspects can support business processes (and other processes) where there is explicit or inherent dependency.

Figure 2:
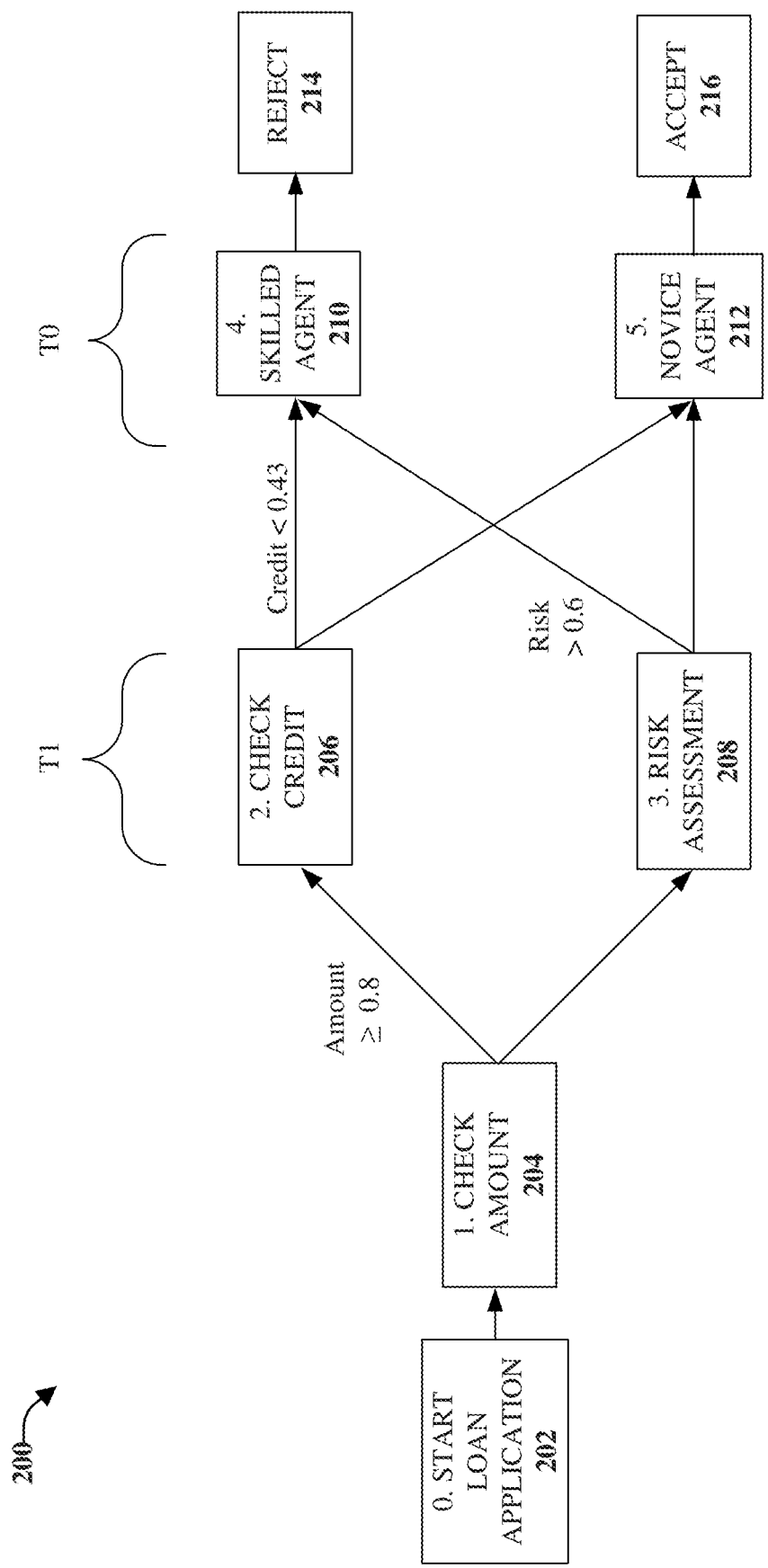
FIG. 2 illustrates an example, non-limiting, business flow model in accordance with one or more embodiments described herein.

In further detail, FIG. 2 illustrates an example, non-limiting, business flow model 200 in accordance with one or more embodiments described herein. Repetitive description of like elements employed in other embodiments described herein is omitted for sake of brevity. The example business model flow relates to a loan approval business process. It is noted that the examples provided herein are simple examples for purposes of explaining the one or more embodiments. However, in practice, the model flows can be quite complex.

The business flow model 200 starts and a loan application process can be started (e.g., start loan application 202). As a first step, an amount of the loan request can be checked (e.g., check amount 204) to determine if the loan amount is lower than a threshold amount, or at or above the threshold amount. For purposes of this example, the threshold amount is eighty dollars ($80.00). Accordingly, if the amount is $80.00 or more, a credit check can be performed (e.g., credit check 206). However, if the amount is less than the threshold amount ($80.00 in this example), risk assessment 208 can be analyzed.

If the credit check 206 indicates that the credit level is less than a threshold credit level (e.g., 0.43 (43%) in this example), the loan request is processed by a skilled agent 210. Alternatively, if the credit level is at or above the threshold level, the loan is processed by a novice agent 212.

In the cases where risk assessment 208 is analyzed, a determination can be made whether the risk assessment 208 is at or more than a threshold risk assessment level, or below the risk assessment level. For purposes of this example, the risk threshold risk assessment level can be 0.6 or 60%. Accordingly, if the risk assessment is 60% or more, the loan is processed by the skilled agent 210. Alternatively, if the risk assessment is less than 60% the loan is processed by the novice agent 212.

Further, in most cases, if the loan is processed by the skilled agent 210, the loan is rejected 214. However, in most cases, if the loan is processed by the novice agent 212, the loan is approved (e.g., accepted 216). For purposes of explanation, it will be assumed that loans processed by the skilled agent 210 will always be rejected 214 and loans processed by the novice agent 212 will always be accepted 216.

Figure 3:
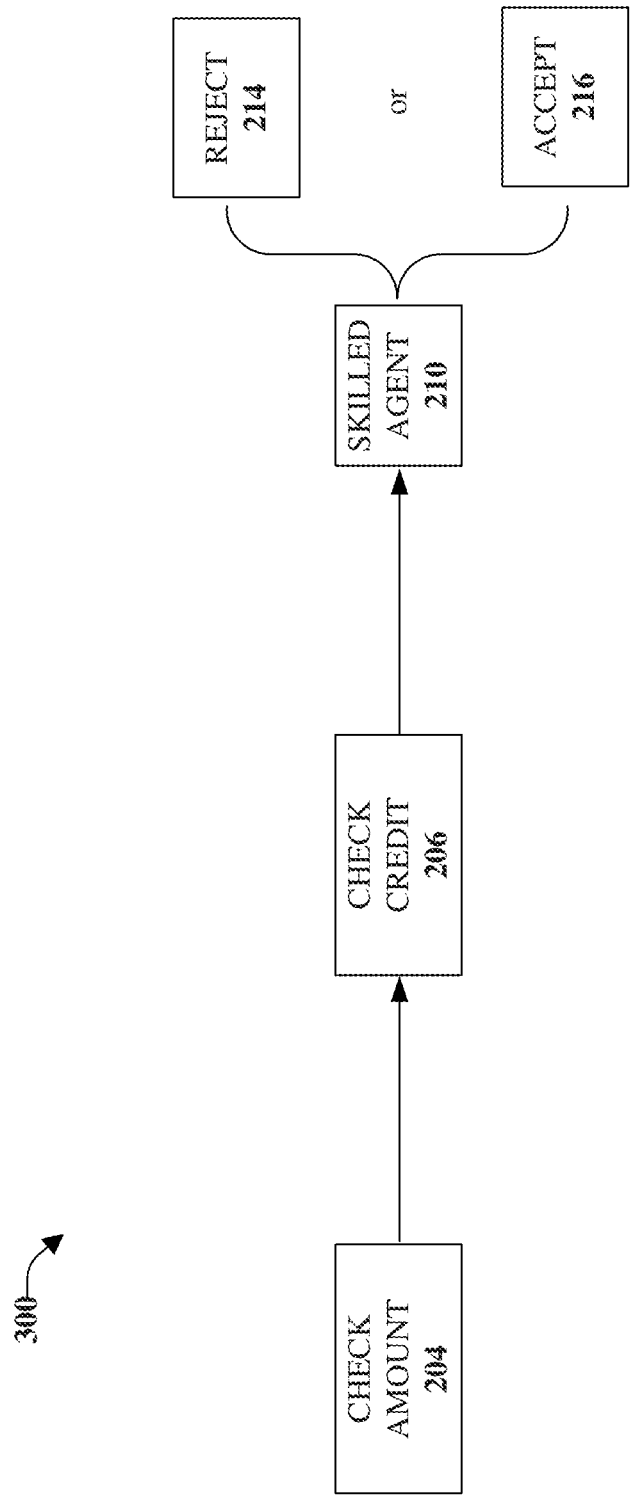
FIG. 3 illustrates an example, non-limiting, trace for prediction of a next activity for the business model flow of FIG. 2 in accordance with one or more embodiments described herein.

To further explain the disclosed aspects, FIG. 3 illustrates an example, non-limiting, trace 300 for prediction of a next activity for the business flow model 200 of FIG. 2 in accordance with one or more embodiments described herein. Repetitive description of like elements employed in other embodiments described herein is omitted for sake of brevity.

A problem associated with a model is how to predict the next activity. In the example provided, it should be determined whether, given a loan request, the loan will be accepted or rejected.

The trace 300 in this example is for a well-known problem, however, in practice the trace can be for an obscure problem. For example, if the loan amount is checked (e.g., check amount 204), a credit check 206 is performed. Therefore, the loan is processed by the skilled agent 210. The loan can be either rejected 214 or accepted 216, which is what needs to be determined.

Figure 4:
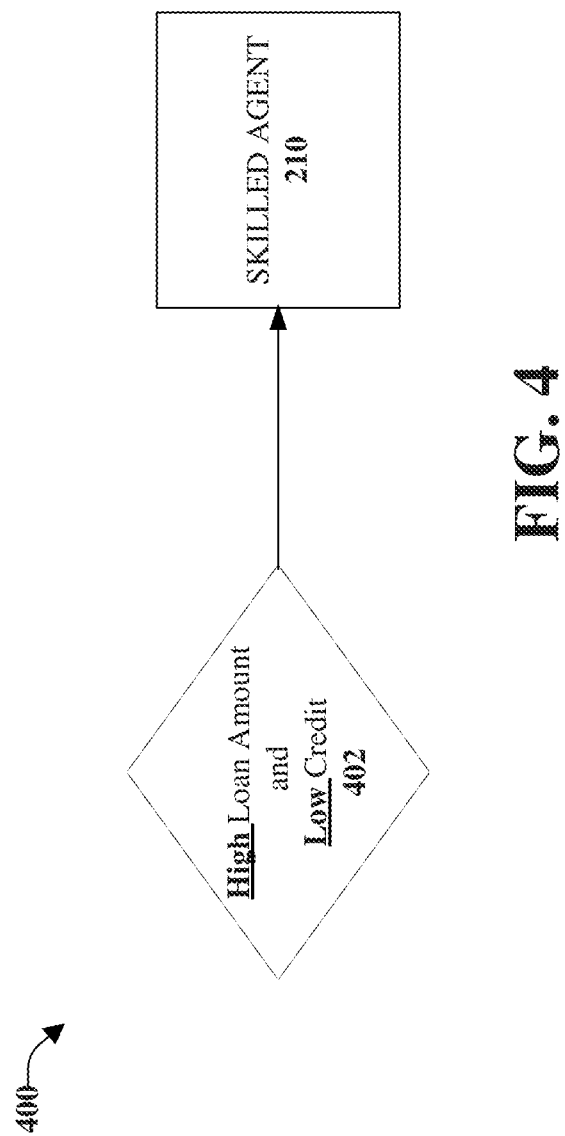
FIG. 4 illustrates an example, non-limiting, representation of an inherent dependency among features of the business model flow of FIG. 2 in accordance with one or more embodiments described herein.

FIG. 4 illustrates an example, non-limiting, representation 400 of an inherent dependency among features of the business flow model 200 of FIG. 2 in accordance with one or more embodiments described herein. Repetitive description of like elements employed in other embodiments described herein is omitted for sake of brevity.

As illustrated, there is dependency between a high loan amount and a low credit, as indicated at 402. These two factors result in the loan application being sent to the skilled agent 210 (and the application will ultimately be rejected 214).

Figure 5:
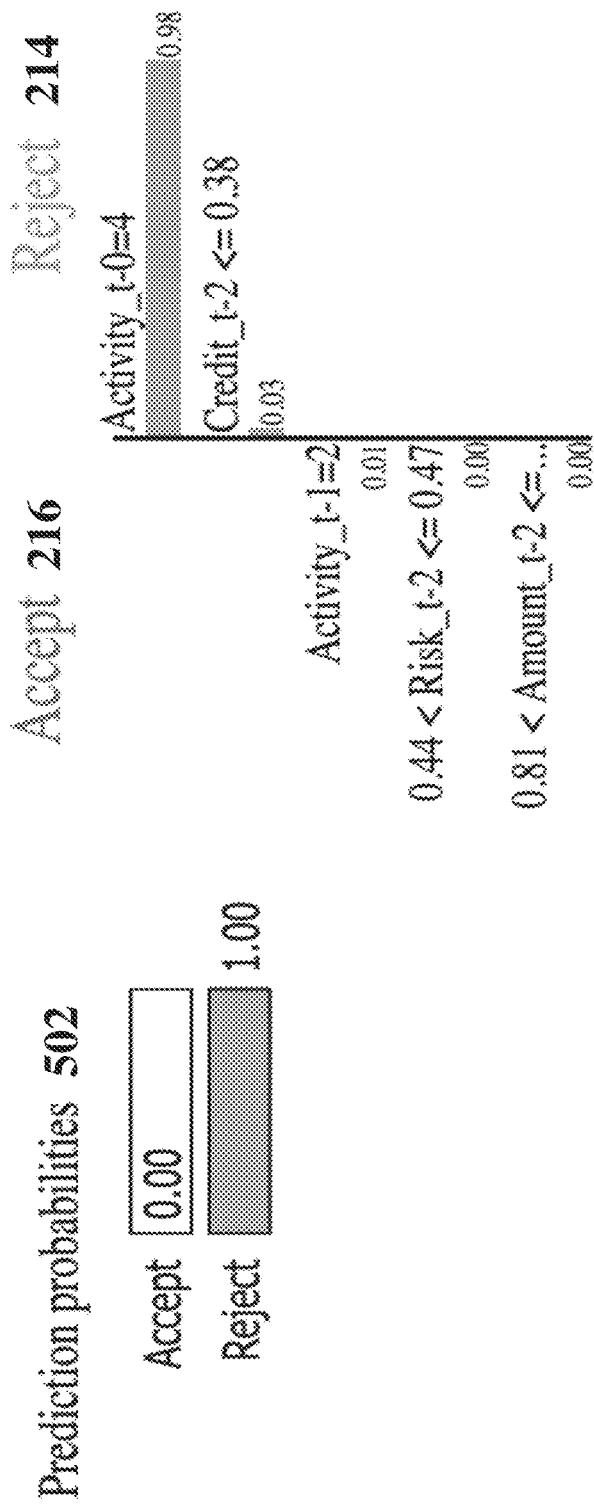
FIG. 5 illustrates an example, non-limiting, representation of a prediction without using the disclosed aspects.

FIG. 5 illustrates an example, non-limiting, representation of a prediction without using the disclosed aspects. Repetitive description of like elements employed in other embodiments described herein is omitted for sake of brevity.

In this example, a trace is run (e.g., executed), which indicates for defined values for the credit (e.g., more than $80, less than $80, or $80 exactly) and for defined values for the loan (e.g., risk assessment level, credit score), what is the outcome or, what is the single feature that will determine if the loan will be allowed or rejected.

On the left side of FIG. 5 are prediction probabilities 502, which indicate whether, based on the model, it is expected that the loan application will be accepted 216 or rejected 218. In this case, the acceptance level is zero percent (0%) and the rejection level is one hundred percent (100%). Therefore, it can be predicted that the loan will be rejected with certainty.

On the right side of FIG. 5 are activity outcomes, which can include the conditions or factors that would result in the loan being accepted 216 (e.g., the risk level being within a defined range, the amount of the loan being within a defined range, and so on). The activity outcomes can also include the conditions or factors that would result in the loan being rejected 214. In this example, the model predicted that the activity outcome (Activity_t-0=4) would result in a 98% rejection.

Refer back to FIG. 2 where the skilled agent 210 is number 4 of the business flow model 200 (e.g., 4. Skilled Agent 210), which corresponds with number 4 in Activity_t-0=4. This indicates that the single contributing feature is the skilled agent. However, simply indicating that the contributing feature is the skilled agent is an incomplete explanation. Instead, the prediction explanation should have indicated that the loan was rejected because of low credit score, high risk, a high loan request amount, or combinations thereof. Accordingly, the example of FIG. 5 provides an incomplete explanation because the model looks at the one or more input features independently and picks one to explain the result, which is a problem associated with conventional systems.

Figure 6:
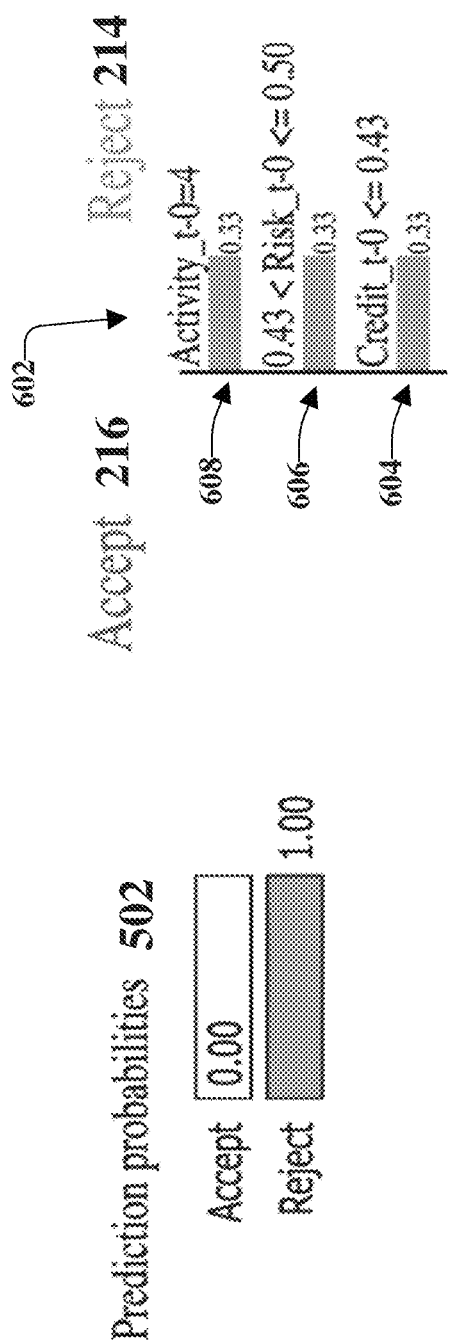
FIG. 6 illustrates an example, non-limiting, representation of a prediction in accordance with one or more embodiments described herein.

FIG. 6 illustrates an example, non-limiting, representation of a prediction in accordance with one or more embodiments described herein. Repetitive description of like elements employed in other embodiments described herein is omitted for sake of brevity.

In this case, the predicted rejection is still the same at one hundred percent. However, the explanation for the rejection is more detailed. Specifically, the explanation indicates that the rejection is because the loan application went to the skilled agent, because there is a high risk associated with the loan (e.g., above a defined risk level), and because the credit value was less than a defined threshold (e.g., low credit).

For example, in this case the credit is less than 0.43. Refer back to FIG. 2, which indicates that if the credit check 206 is less than 0.43 then the loan application is referred to the skilled agent 210. It is noted that the numbers or values provided herein are for example purposes only and the actual values can be based on rules and/or policies.

Thus, provided are multiple explanations 602 for the loan being rejected 214 indicate that the loan is being rejected because the credit score is less than the defined credit score level, as indicated at 604. It further explains that the loan was rejected because, the risk is between 0.43 and 0.50, as indicated at 606, which was less than expected. Further, the explanation indicates that the loan was rejected because the application was sent to the skilled agent, as indicated at 608. In this case the loan application was sent to the skilled agent because of the low credit score and the high risk level.

Based on the multiple explanations, the entity applying for the loan can be provided knowledge of what features to focus on to increase the chances of obtaining a loan in the future (e.g., increase credit score, request less money). In contrast, the explanation given in FIG. 5 is that the loan was rejected because it went to the skilled agent. Accordingly, the entity could attempt to obtain a loan from a different financial institution and become frustrated when the loan is again denied.

Figure 7:
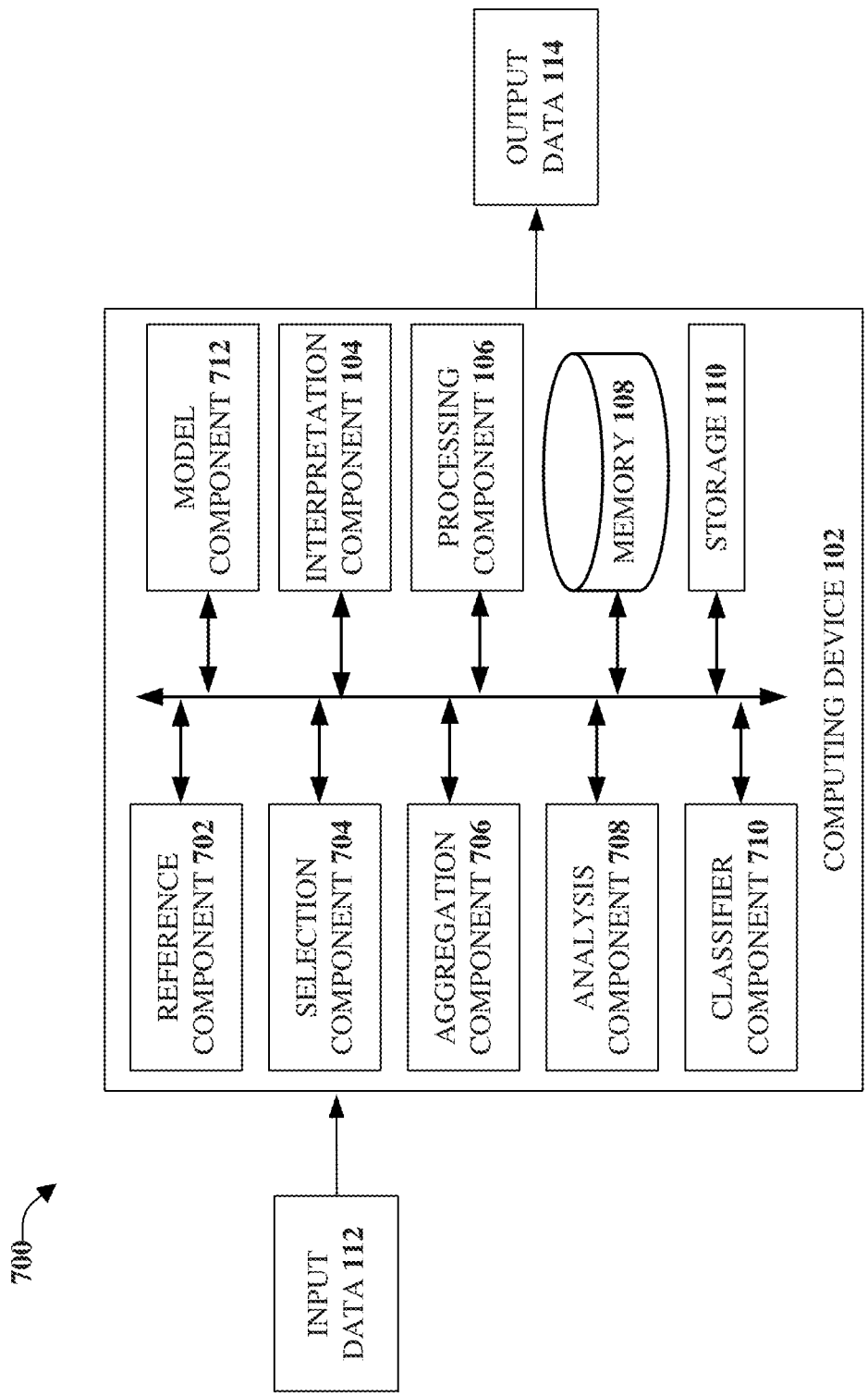
FIG. 7 illustrates a block diagram of an example, non-limiting, system that facilitates explanations of model predictions based on causal reasoning in accordance with one or more embodiments described herein.

FIG. 7 illustrates a block diagram of an example, non-limiting, system 700 that facilitates explanations of model predictions based on causal reasoning in accordance with one or more embodiments described herein. Repetitive description of like elements employed in other embodiments described herein is omitted for sake of brevity. The system 700 can comprise one or more of the components and/or functionality of the system 100, and vice versa.

Figure 8:
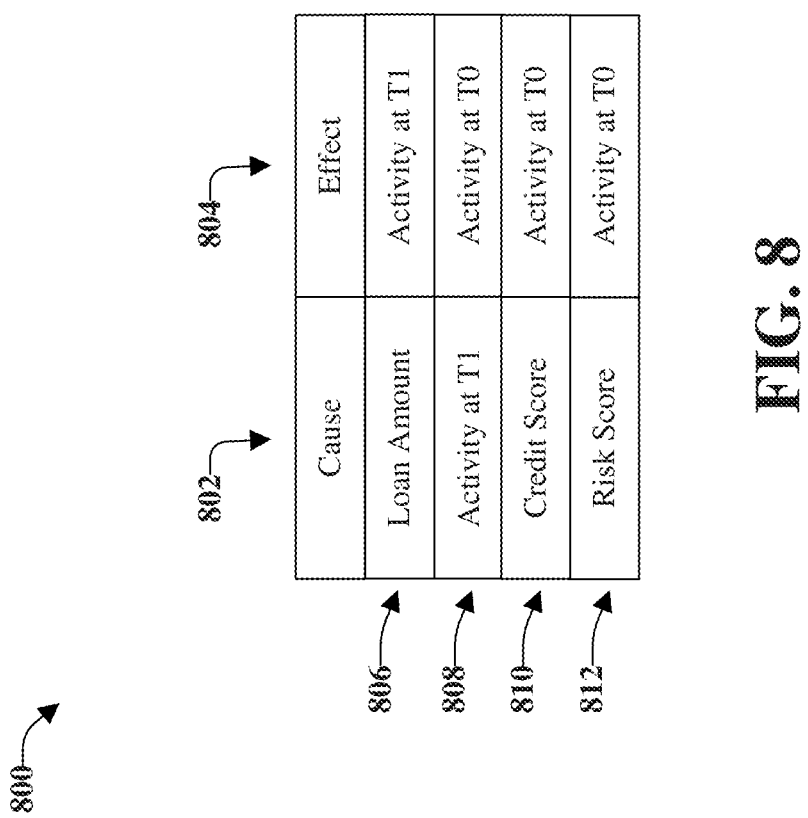
FIG. 8 illustrates an example, non-limiting, causal table of causal relationships determined in accordance with one or more embodiments described herein.

A reference component 702 can determined causal relationships (e.g., dependencies) of the input data 112. For example, the reference component 702 can determine causal relationships between features and a defined process flow graph. Using the above example, the features can be loan amount, credit score, risk assessment 208, skilled agent 210, novice agent 212, and the process flow graph can be the business flow model 200 of FIG. 2. The causal relationships can be determined by the reference component 702 based on analysis and/or through one or more tools designed to determine causal relationships. For example, FIG. 8 illustrates an example, non-limiting, causal table 800 of causal relationships determined by the reference component 702 in accordance with one or more embodiments described herein. Repetitive description of like elements employed in other embodiments described herein is omitted for sake of brevity.

Using the loan example from above, the reference component 702 can evaluate the business flow model 200 of FIG. 2. There is an explicit edge from credit check 206 to skilled agent 210 (indicated by the line between credit check 206 and skilled agent 210). There is another explicit edge between credit check 206 and the novice agent 212. Thus, every time there is a credit check, the loan application could be sent to the skilled agent 210 or the novice agent 212. Additionally, every time there is a loan amount (e.g., check amount 204), there can be a credit check 206 or a risk assessment 208. These are the explicit dependencies, and are labeled as T1 and T0 at the top of FIG. 2.

The causal table 800 illustrates causes 802 in the first column and effects 804 in the second column. The reference component 702 can evaluate the data and identify which relationships are dependent on one another. For example, as illustrated in first row 806, the loan amount effect is activity at T1 (e.g., check credit or risk assessment). Second row 808 indicates that the activity at T1 effects Activity at T0. The third row 810 indicates that credit score (e.g., credit check) effects activity at T0. Further, the fourth row 812 indicates that risk score effects activity at T0. Thus, not only the shape of the model, but the variables (e.g., "is loan amount more than 0.8," "is credit score less than 0.43," is risk more than 0.6") are used for the evaluations discussed herein.

With continuing reference to FIG. 7, based on a trace x (e.g., the trace 300), a classifier c and its prediction y, a selection component 704 can select one or more features from trace x that contribute mostly to the prediction y. Upon or after the causal table 800 is determined, the aggregation component 706 can group features that have causal relationships together. For example, the aggregation component 706 can group the feature data of a set of feature data based on causal relationships. For example, the set of feature data can comprise five feature data (e.g., feature data one, feature data two, feature data three, feature data four, and feature data five). Feature data one, feature data three, and feature data four can be determined to have a causal relationship with one another. Further, feature data two, feature data three, feature data four, and feature data five can be determined to have a causal relationship with one another. According to this simple example, the aggregation component 706 can group together feature data one, feature data three, and feature data four. Further, the aggregation component 706 can group together feature data two, feature data three, feature data four, and feature data five. The term "grouped together" relates to providing data (e.g., metadata) that is indicative of the causal relationships between the feature data.

According to an implementation, the aggregation component 706 can independently group the feature data of the set of feature data based on one or more feature data having a same relationship. Thus, the reference component 702 can provide information indicative of the causal relationships to the aggregation component 706, as well as other system components.

In some implementations, the aggregation component 706 can group first feature data of the set of feature data based on a first causal relationship and second feature data of the set of feature data based on a second causal relationship. In some cases, feature data can be associated with both the first feature data and the second feature data (e.g., the feature data three of the above example). Further, in some cases, a feature data of the first feature data and a feature data of the second feature data is a same feature data (e.g., the feature data three of the above example).

With reference also to FIG. 8, the aggregation component 706 can group the features in different ways. For example, grouping can be performed per row. Thus, in the example of FIG. 8, a first grouping can be for the first row 806 (e.g., group loan amount and activity at T1); a second grouping can be for the second row 808 (e.g., group activity at T1 and activity at T0); a third grouping can be for the third row 810 (e.g., group credit score and activity at T0); and a fourth grouping can be for the fourth row 812 (e.g., group risk score and activity at T0). Grouping by row can identify how many features are dependent on one another. Grouping should be performed because, when the sample values x change, the changes should follow the dependencies for the features. For example, since the features can be highly related, the feature should be perturbed based on the groups. Accordingly, grouping is beneficial because perturbation that is not group aware will perturb the features independent from one another. For example, if not group aware, the loan amount will be perturbed, but not activity at T1 (with respect to the first row 806).

Another manner of grouping can be to group by effected activity. FIG. 9A through 9C illustrate grouping together features that have causal relationships based on effected activity in accordance with one or more embodiments described herein. Specifically, FIG. 9A illustrates splitting a causal table based on effected activity, in accordance with one or more embodiments described herein. FIG. 9B illustrates grouping the causes and effect features in accordance with one or more embodiments described herein. FIG. 9C illustrates handling overlap between groups in accordance with one or more embodiments described herein. Repetitive description of like elements employed in other embodiments described herein is omitted for sake of brevity.

For example, the causal table 800 can be split based on effected activity (e.g., the type of effect that is caused). As illustrated, there are two effects (e.g., activity at T1 and activity at T0). Therefore, the causal table 800 can be split into group T1 and group T0 as indicated in FIG. 9A. In this example, there is one type of causing (e.g., loan amount) that effect activity at T1. Further to this example, there are three types of causing (e.g., activity at T1, credit score, and risk score) that effect activity at T0.

Upon or after the causal table is split based on effected activity, the causes and effect features can be grouped together. This grouping is indicated in FIG. 9B where the first group T1 and the second group T0 are divided into separate groupings. Accordingly, in this example, there are two groupings (as compared to the four groupings discussed above that grouped by rows).

FIG. 9C illustrates a situation where there is overlap between two or more groups. As illustrated, the first group T1 includes "activity at T1" 902 and the second group T2 also includes "activity at T1" 904. Based on the overlap between groups, the aggregation component 706 can indicate that the perturbations for these overlapping features should have the same value. Since there are overlapping features, when activity at T1 changes, the activity at T0 can be effected. For example, when the loan amount of the above example is changed, the system 700 should ensure that the entire path remains valid.

Further, an analysis component 708 can sample points around the trace x. The sample points can follow the process flow (e.g., the business flow model 200) and the causal relationships between the feature data. For example, points can be generated around the different features (e.g., loan amount, credit score, risk score, and so on). The samples that occur should following the grouping and ensure that the samples are in compliance with these dependencies. Thus, the samples generated should follow the relationship (e.g., dependently change the values). For example, if the loan amount is increased, or the risk is decreased, the credit limit should be increased. In an example, traces could be generated and upon or after the permutations are performed, it could be determined that they are not compliant and, therefore, are discarded.

A classifier component 710 can use a classifier c to obtain labels of the sample points. According to some implementations, the classifier c can be a deep/machine learning model (e.g., LSTM, and so on). In another example, the classifier c can be a black box (e.g., trained by another entity, or the data used to train it is private).

The interpretation component 104 can generate one or more explanations of a machine learning model prediction. The machine learning model prediction can be processed by a modeling component 712. For example, the modeling component 712 can train a model to determine one or more predictions of an output based on received input data. For example, a simple model can be utilized to approximate classifier c decision. In an example, the simple model can be linear regression, decision tree, and so on.

Figure 10:
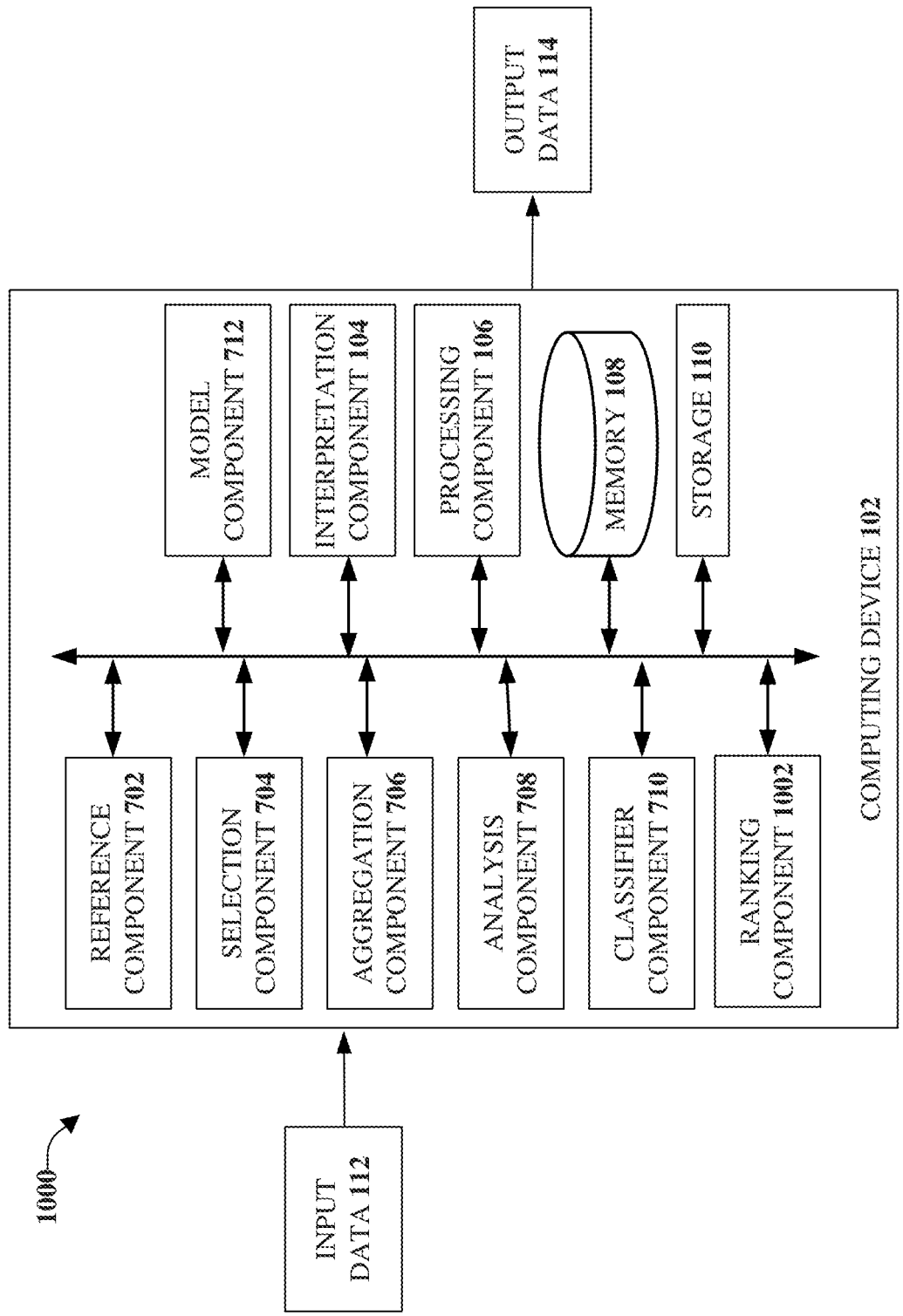
FIG. 10 illustrates a block diagram of an example, non-limiting, system that facilitates ranking feature data based on contribution level in accordance with one or more embodiments described herein.

FIG. 10 illustrates a block diagram of an example, non-limiting, system 1000 that facilitates ranking feature data based on contribution level in accordance with one or more embodiments described herein. Repetitive description of like elements employed in other embodiments described herein is omitted for sake of brevity. The system 1000 can comprise one or more of the components and/or functionality of the system 100, the system 700, and vice versa.

A ranking component 1002 can sort the feature data of the group of feature data into an ordering based on a contribution level associated with one or more determinations of the machine learning model prediction. Further to this example, the interpretation component 104 can output the one or more explanations based on the ordering determined by the ranking component 1002. In another example, feature data that comprises a first contribution level that satisfies a defined contribution level can be determined, by the ranking component 1002, to contribute more to the one or more determinations than other feature data that comprise second contribution levels that fail to satisfy the defined contribution level.

As discussed herein the various aspects use relevant causal factors generated by one or more models to provide one or more explanations of the one or more decisions of the one or more models. In some implementations, there can be multiple types of causal relationships generated as inputs to the system with the goal of explaining which features helped influence the machine learning decision the most. The inputs can be the sequence of the data according to some implementations. The causal relationships can be generated using different methods such as static program analysis, causal inferences, or business process model descript as input to the system which provides one or more explanations as to what features contributed the most to the decision/prediction of the machine learning model. Further, the disclosed aspects provide enhanced/augmented black box AI model explanations through the use of causal reasoning. Further, the disclosed aspects can generate causal relationships and feed the causal relationships into an explanation system to obtain the one or more explanations.

Figure 11:
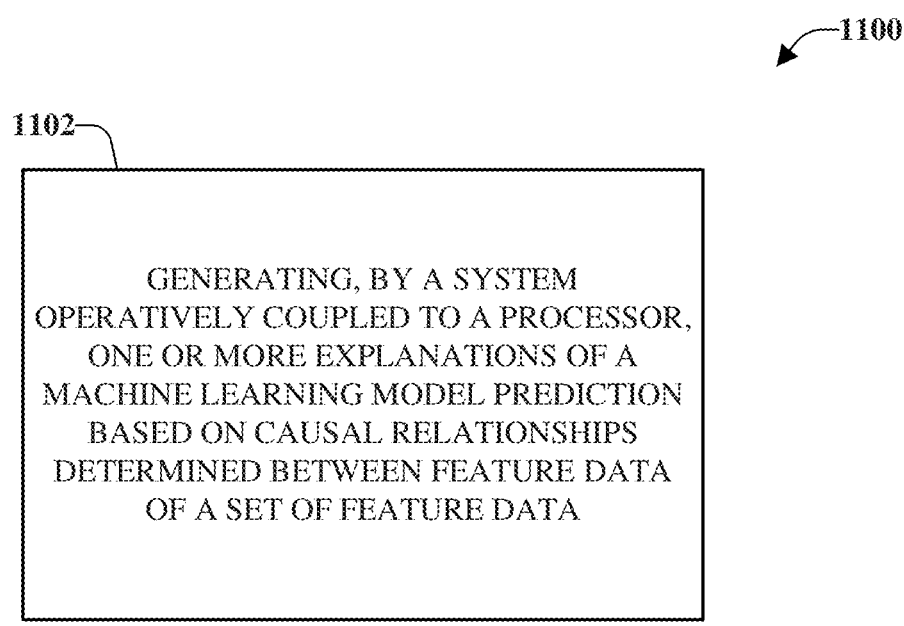
FIG. 11 illustrates a flow diagram of an example, non-limiting, computer-implemented method that facilitates causal reasoning for explanation of model predictions in accordance with one or more embodiments described herein.

FIG. 11 illustrates a flow diagram of an example, non-limiting, computer-implemented method 1100 that facilitates causal reasoning for explanation of model predictions in accordance with one or more embodiments described herein. Repetitive description of like elements employed in other embodiments described herein is omitted for sake of brevity.

At 1102 of the computer-implemented method 1100, a system operatively coupled to a processor can generate one or more explanations of a machine learning model prediction (e.g., via the interpretation component 104). The one or more explanations can be based on causal relationships determined between feature data of a set of feature data. According to some implementations, the causal relationship can be determined based on dataset point samples around a trace associated with the causal relationships. According to some implementations, the causal relationships can be determined through the use of static program analysis or another type of analysis. The causal relationships can be dependencies between respective feature data of the group of feature data.

Figure 12:
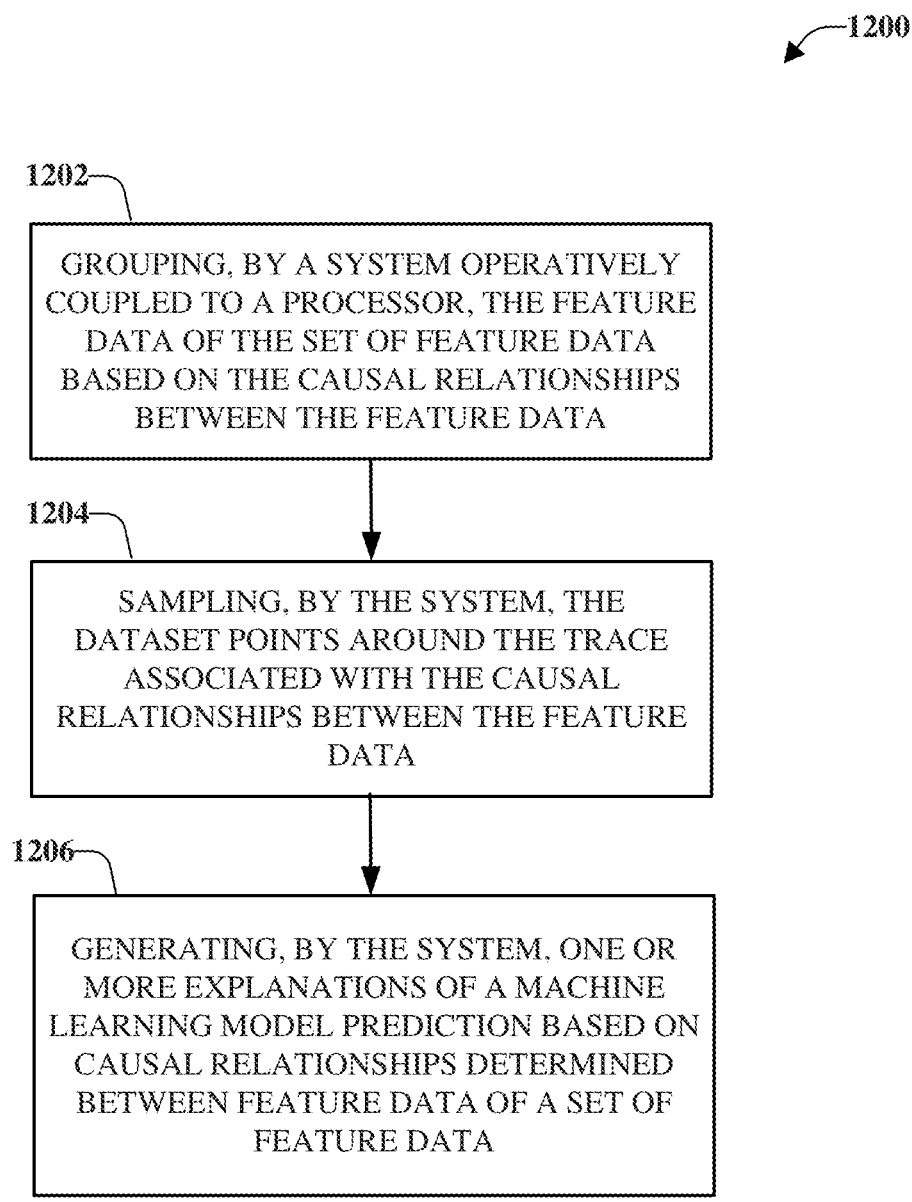
FIG. 12 illustrates a flow diagram of an example, non-limiting, computer-implemented method that facilitates grouping of feature data and sampling data set points in accordance with one or more embodiments described herein.

FIG. 12 illustrates a flow diagram of an example, non-limiting, computer-implemented method 1200 that facilitates grouping of feature data and sampling data set points in accordance with one or more embodiments described herein. Repetitive description of like elements employed in other embodiments described herein is omitted for sake of brevity.

At 1202 of the computer-implemented method 1200, a system operatively coupled to a processor can group feature data of a set of feature data based on causal relationships between the feature data (e.g., via the aggregation component 706).

Further, at 1204 of the computer-implemented method 1200, the system can sample the dataset points around the trace associated with the causal relationships between the feature data (e.g., via the analysis component 708).

Based on the grouping of the feature data and the sampling of the dataset points, at 1206 of the computer-implemented method 1200, the system can generate one or more explanations of a machine learning model prediction based on the causal relationships determined between feature data of the set of feature data (e.g., via the interpretation component 104). According to various implementations, the causal relationships can be determined based on the dataset points samples around the trace associated with the causal relationships, through the use of static program analysis, or through other means.

Figure 13:
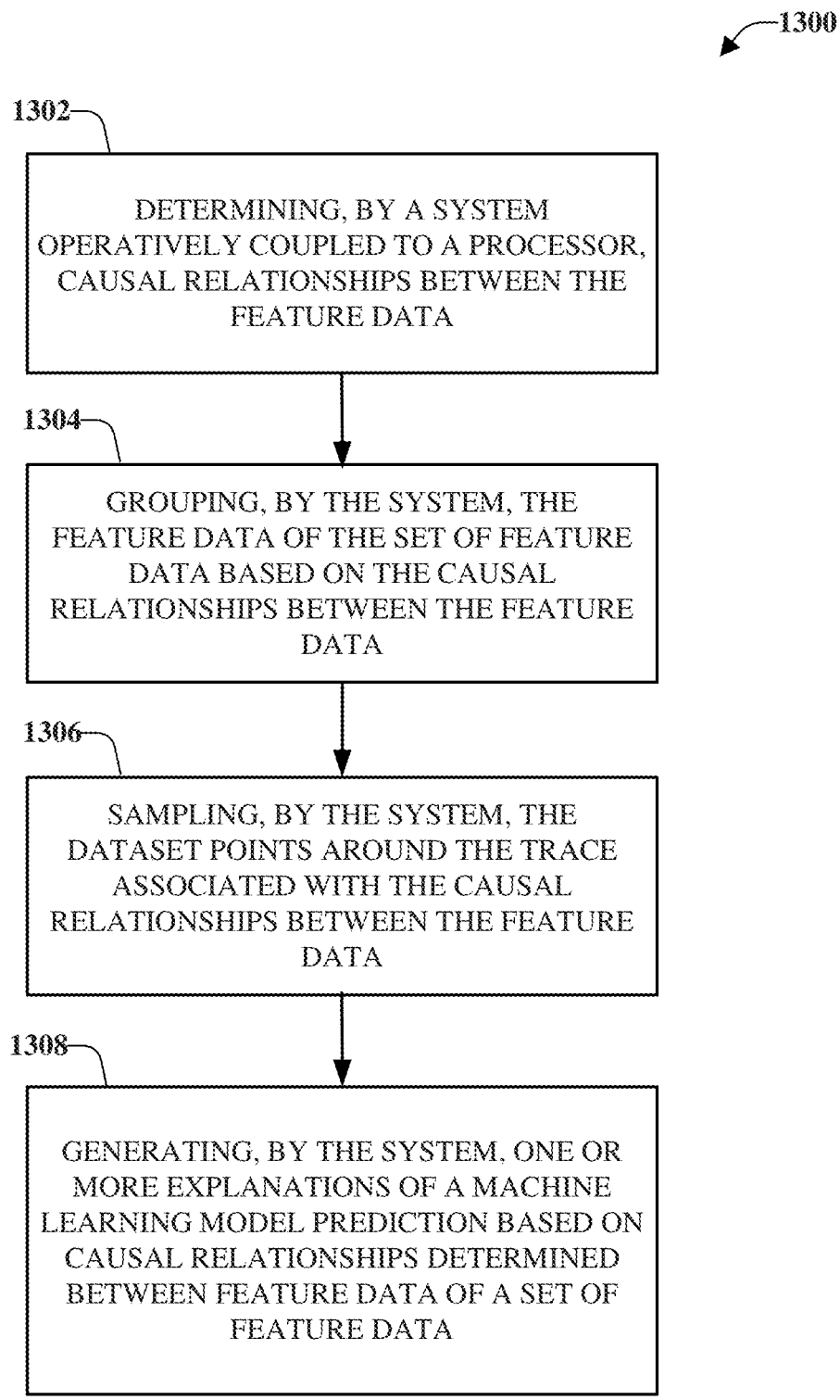
FIG. 13 illustrates a flow diagram of an example, non-limiting, computer-implemented method that facilitates determining causal relationships between feature data for facilitating causal reasoning for explanation of model predictions in accordance with one or more embodiments described herein.

FIG. 13 illustrates a flow diagram of an example, non-limiting, computer-implemented method 1300 that facilitates determining causal relationships between feature data for facilitating causal reasoning for explanation of model predictions in accordance with one or more embodiments described herein. Repetitive description of like elements employed in other embodiments described herein is omitted for sake of brevity.

At 1302 of the computer-implemented method 1300, a system operatively coupled to a processor can determine causal relationships between feature data (e.g., via the reference component 702). For example, the causal relationships between the feature data can be based on a defined process flow graph. The causal relationships can be dependencies between respective feature data of the group of feature data.

Upon or after determining the causal relationships, at 1304, the system can group feature data of a set of feature data based on causal relationships between the feature data (e.g., via the aggregation component 706).

Further, at 1304 of the computer-implemented method 1300, the system can sample the dataset points around the trace associated with the causal relationships between the feature data (e.g., via the analysis component 708).

Based on the grouping of the feature data and the sampling of the dataset points, at 1306 of the computer-implemented method 1300, the system can generate one or more explanations of a machine learning model prediction based on the causal relationships determined between feature data of the set of feature data and based on the dataset points samples around the trace associated with the causal relationships (e.g., via the interpretation component 104).

Figure 14:
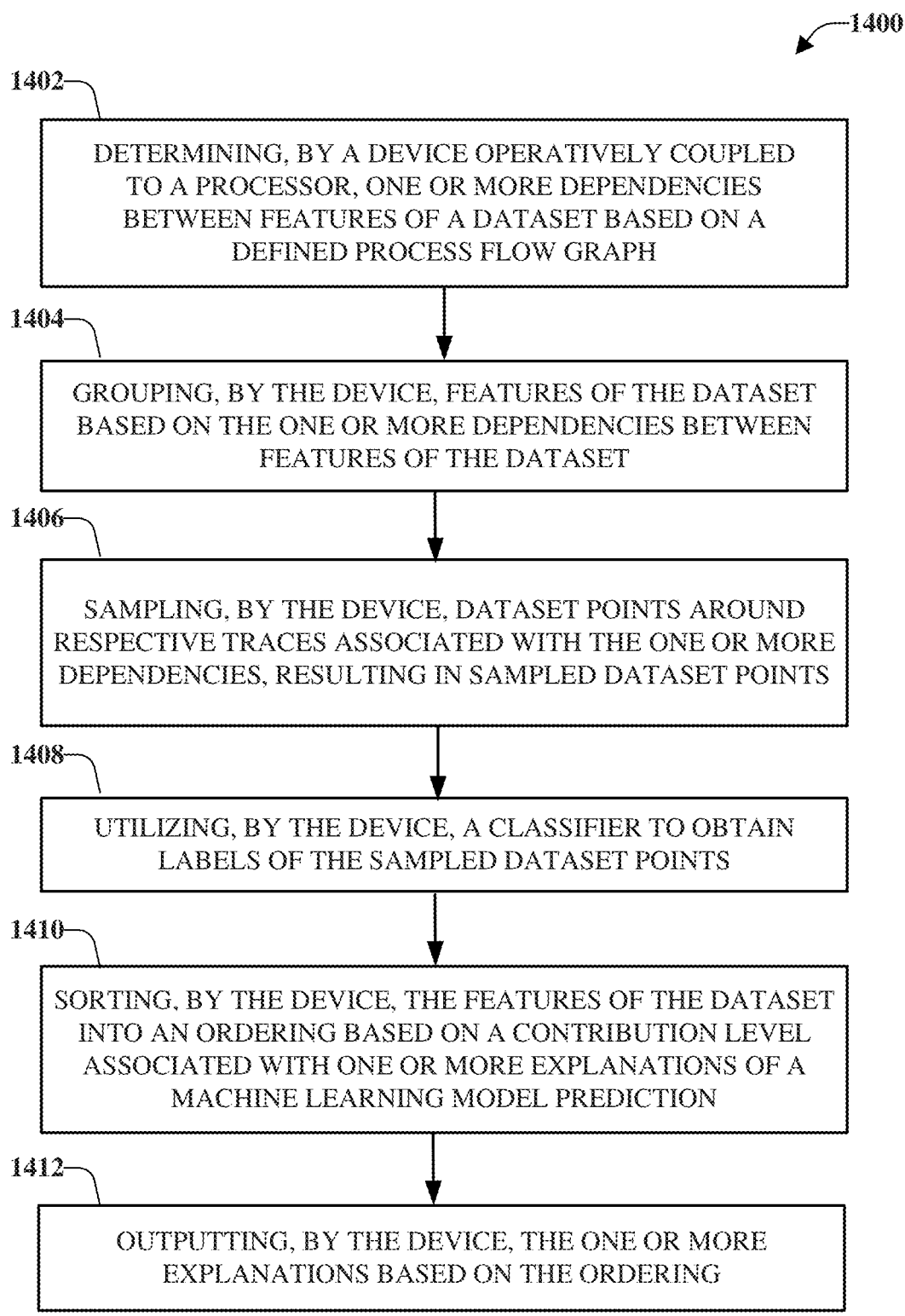
FIG. 14 illustrates a flow diagram of an example, non-limiting, computer-implemented method that facilitates providing one or more explanations of model predictions based on causal relationships between feature data in accordance with one or more embodiments described herein.

FIG. 14 illustrates a flow diagram of an example, non-limiting, computer-implemented method 1400 that facilitates providing one or more explanations of model predictions based on causal relationships between feature data in accordance with one or more embodiments described herein. Repetitive description of like elements employed in other embodiments described herein is omitted for sake of brevity.

At 1402 of the computer-implemented method, a device operatively coupled to a processor can determine features of the dataset based on the one or more dependencies between features of the dataset (e.g., via the reference component 702). At 1404, the device can group features of the dataset based on the one or more dependencies between features of the dataset (e.g., via the aggregation component 706).

The device can sample dataset points around respective traces associated with the one or more dependencies, at 1406 of the computer-implemented method 1400 (e.g., via the analysis component 708). Sampling the dataset points can result in sampled dataset points. Further, at 1408 of the computer-implemented method 1400, the computing device can utilize a classifier to obtain labels of the sampled dataset points (e.g., via the classifier component 710).

At 1410, the device can sort the features of the dataset into an ordering based on a contribution level associated with one or more explanations of a machine learning model prediction (e.g., via the ranking component 1002). The one or more explanations can be output, at 1412 of the computer-implemented method, based on the ordering (e.g., via the interpretation component 104).

As discussed herein, the focus is on applications that have inherent dependencies and causation (e.g., business process applications). Causal reasoning can be utilized to provide improved feature explanation behind the prediction. A structural causal graph of the process can be generated and used to generate feasible feature candidates for explanation. The causal graph can also be used to provide a better explanation of the outcome.

Given a sequence and its prediction, the problem/explanation is to select features impacting the prediction the most. LIME algorithms first perturb the given example to have the surrounding examples (e.g., modify one feature, and fix others). Next the LIME algorithms use explainable classifier (e.g. linear regression) to have explanations. The assumption of LIME algorithms is that the features are independent. Accordingly, the LIME algorithm does not work well in many situations.

Therefore, with the disclosed aspects when the given examples are perturbed, the space that is feasible in a real scenario can be limited to generate surrounding examples. For example, the following is a sequence example in business process, there could exist some path that is impossible to traverse (it is noted that the LIME algorithm does not consider the path). A structural causal graph can be constructed to determine causal relationships between the sequences/features. The features/sequence that have causal relationships can be grouped together then an explainable classifier (similar to linear regression) can be utilized to provide explanations. Because features are grouped together, various features can be selected as a group or multiple groups.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 15:
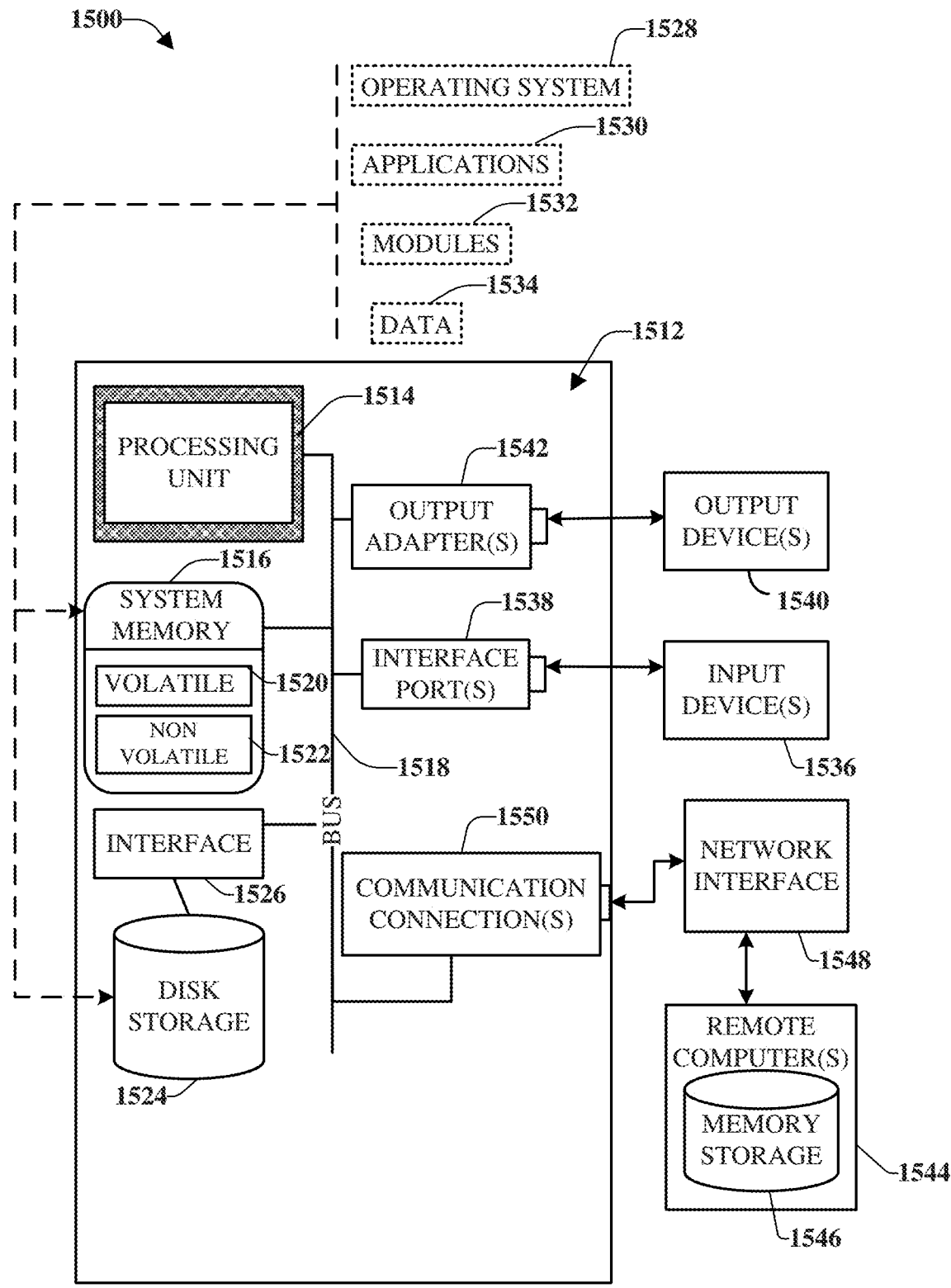
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity. With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1520 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a method of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        an aggregation component that groups feature data of a set of feature data based on causal relationships between the feature data;
        an analysis component that samples dataset points around a trace associated with the causal relationships between the feature data; and
        an interpretation component that generates one or more explanations of a machine learning model prediction based on the causal relationships determined between the feature data of the set of feature data.

2. The system of claim 1, wherein the aggregation component independently groups the feature data of the set of feature data based on one or more feature data having a same relationship.

3. The system of claim 1, wherein the aggregation component groups first feature data of the set of feature data based on a first causal relationship and second feature data of the set of feature data based on a second causal relationship.

4. The system of claim 3, wherein the feature data can be associated with both the first feature data and the second feature data.

5. The system of claim 3, wherein a feature data of the first feature data and a feature data of the second feature data is a same feature data.

6. The system of claim 1, further comprising:
a reference component that determines the causal relationships between the feature data and provides information indicative of the causal relationships to the aggregation component.

7. The system of claim 1, further comprising:
a reference component that determines the causal relationships between the feature data based on a defined process flow graph and provides information indicative of the causal relationships to the aggregation component.

8. The system of claim 1, wherein the causal relationships are dependencies between respective feature data of the set of feature data.

9. A computer-implemented method, comprising:
grouping, by a system operatively coupled to a processor, feature data of a set of feature data based on causal relationships between the feature data;
sampling, by the system, dataset points around a trace associated with the causal relationships between the feature data; and
generating, by the system, one or more explanations of a machine learning model prediction based on the causal relationships determined between the feature data of the set of feature data.

10. The computer-implemented method of claim 9, wherein the grouping comprises grouping the feature data of the set of feature data independently based on one or more feature data having a same relationship.

11. The computer-implemented method of claim 9, further comprising:
determining, by the system, the causal relationships between the feature data based on a defined process flow graph.

12. The computer-implemented method of claim 9, wherein the causal relationships are dependencies between respective feature data of the set of feature data.

13. The computer-implemented method of claim 9, wherein the grouping comprises grouping first feature data of the set of feature data based on a first causal relationship and second feature data of the set of feature data based on a second causal relationship.

14. The computer-implemented method of claim 13, wherein a feature data of the set of feature data can be associated with both the first feature data and the second feature data.

15. The computer-implemented method of claim 13, wherein a feature data of the first feature data and a feature data of the second feature data is a same feature data.

16. A computer program product that facilitates causal reasoning for explanations of model predictions, the computer program product comprising a non-transitory computer readable medium having program instructions embodied therewith, the program instructions are executable by a processor to cause the processor to:
group feature data of a set of feature data based on causal relationships between the feature data;
sample dataset points around a trace associated with the causal relationships between the feature data; and
generate one or more explanations of a machine learning model prediction based on the causal relationships determined between the feature data of the set of feature data.

17. The computer program product of claim 16, wherein the program instructions further cause the processor to:
determine the causal relationships between the feature data based on a defined process flow graph.

18. A computer-implemented method, comprising:
determining, by a device operatively coupled to a processor, one or more dependencies between features of a dataset based on a defined process flow graph;
grouping, by the device, the features of the dataset based on the one or more dependencies between the features of the dataset;
sampling, by the device, dataset points around respective traces associated with the one or more dependencies, resulting in sampled dataset points;
utilizing, by the device, a classifier to obtain labels of the sampled dataset points;
sorting, by the device, the features of the dataset into an ordering based on a contribution level associated with one or more explanations of a machine learning model prediction; and
outputting, by the device, the one or more explanations based on the ordering.

19. The computer-implemented method of claim 18, wherein the sampling the dataset points comprises sampling, by the device, the dataset points around the respective traces associated with the one or more dependencies and based on the defined process flow graph.

20. The computer-implemented method of claim 18, wherein the one or more dependencies are causal relationships between the features of the dataset and the defined process flow graph.

21. The computer-implemented method of claim 18, wherein the features that comprise a first contribution level that satisfy a defined contribution level are determined to contribute more to the one or more explanations than other features that comprise second contribution levels that fail to satisfy the defined contribution level.

22. A device, comprising:
a memory that stores computer executable components; and
a processor that executes the computer executable components stored in the memory, wherein the computer executable components comprise:
a reference component that determines one or more dependencies between features of a dataset based on a defined process flow graph;
an aggregation component that groups the features of the dataset based on the one or more dependencies between the features of the dataset;
an analysis component that samples dataset points around respective traces associated with the one or more dependencies, resulting in sampled dataset points;
a classifier component that obtains labels of the sampled dataset points;
a ranking component that sorts the features of the dataset into an ordering based on a contribution level associated with one or more explanations of a machine learning model prediction; and
an interpretation component that outputs the one or more explanations based on the ordering.

23. The device of claim 22, wherein the analysis component samples the dataset points around the respective traces associated with the one or more dependencies and based on the defined process flow graph.

24. The device of claim 22, wherein the one or more dependencies are causal relationships between the features of the dataset and the defined process flow graph.

25. The device of claim 22, wherein the features that comprise a first contribution level that satisfy a defined contribution level are determined to contribute more to the one or more explanations than other features that comprise second contribution levels that fail to satisfy the defined contribution level.

* * * * *